May 8, 1962 R. J. BUEGLER ETAL 3,033,447

AUTOMATIC COMPUTER PROGRAM SYSTEM

Filed Aug. 7, 1957 5 Sheets-Sheet 1

INVENTORS
ROBERT J. BUEGLER
JOSEPH F. MC CARROLL, JR.
BY
[signature]
ATTORNEY

INVENTORS
ROBERT J. BUEGLER
JOSEPH F. McCARROLL, JR.
BY [signature]
ATTORNEY

May 8, 1962 R. J. BUEGLER ETAL 3,033,447

AUTOMATIC COMPUTER PROGRAM SYSTEM

Filed Aug. 7, 1957 5 Sheets-Sheet 3

INVENTORS
ROBERT J. BUEGLER
JOSEPH F. McCARROLL, JR.
BY
[signature]
ATTORNEY

INVENTORS
ROBERT J. BUEGLER
JOSEPH F. McCARROLL, JR.
BY
V. F. Presson
ATTORNEY

AUTOMATIC COMPUTER PROGRAM SYSTEM

Filed Aug. 7, 1957 5 Sheets-Sheet 5

INVENTORS
ROBERT J. BUEGLER
JOSEPH F. McCARROLL, JR.
BY
[signature]
ATTORNEY

3,033,447
AUTOMATIC COMPUTER PROGRAM SYSTEM

Robert J. Buegler, Springdale, and Joseph F. McCarroll, Jr., South Norwalk, Conn., assignors to The Telereg-ister Corporation, Stamford, Conn., a corporation of Delaware Filed Aug. 7, 1957, Ser. No. 676,836
19 Claims. (Cl. 235—61.6)

This invention relates to data processing equipment. It is capable of various applications, including the control of magnetic inventory systems and other systems generally known as digital computers, statistical "word memories" and the like. More especially the invention is concerned with a novel combination of typewriter, tape punch, tape reader and automatic programming equipment designed to operate under control of the tape reader and other control means for data processing needs.

The invention also deals with a novel method for channeling information out of and into appropriate "bins" of a memory system in connection with the operation of an electronic computer. Essentially, therefore, the invention is a programming facility.

We preferably employ so-called "common language" machines. These are well known. They usually include an electric typewriter having operatively associated therewith a tape punch. With this combination a typist can prepare a coded tape with information punched therein corresponding to any desired portion of what she writes on the sheet of paper in her typewriter. A tape reader may subsequently be used to carry out any desired data processing operations with respect to the information that has been punched in the tape. We shall illustrate this method in the present disclosure by showing how an inventory can be maintained, using the items of data as shown on an invoice for goods shipped. These same items would, of course, be quantitatively coded in the punched tape that is made as a by-product of the written invoice. In this case the inventory balance for each item would be drawn out of its appropriate "bin" of the memory system, reduced by the quantity shown on the invoice as a shipment to the customer, and the remaining balance restored by the computer to the same "bin" as a new recording of the computed balance. The same process may, of course, be carried out with respect to incoming shipments of items that should be added to the inventory, the computer being then programmed to increase the balances instead of reducing them.

One of the main objects of the invention is to utilize a perforated tape which is of the kind used in printing telegraph systems embodying coded perforations representing categories or class of items, other coded perforations representing quantity of such items, and still other perforations representing the conventional "letter space" and "tabulation" functions such as are conventionally employed in automatic printing telegraphs. However, the tape is utilized according to the invention not merely to operate directly a printing telegraph printer but is used to translate the coded perforations in the tape into address signals for data processing machines of the kind having a storage memory and of the random access kind. The present invention is not concerned primarily with such data processing equipment per se, such is well known, but rather with the utilization of a conventional printing telegraph transmitter wherein the "tabulating" and "letter spacing" functions are translated not only to control the mechanical tabulating bar during the printing operation on the printing telegraph typewriter but to produce other specially prepared "address" signals whereby conventional data processing equipment can be controlled from the perforated tape or similar printing telegraph record, without the necessity of the transmitting operator introducing into the tape any special signals for effecting the addressing of the data processing equipment.

It is a primary object of our invention to provide novel combinations of equipment whereby items tabulatively typed on paper and simultaneously punched in tape as equivalent coded information may be data-processed automatically, while at the same time the full identification of each item is given only in part by a category-address, but, as to sub-classification, by the use of code signals punched in the tape to represent either a spacing of the typewriter carriage from one to the next sub-identity column, or tabulation of the typewriter carriage across sub-identity columns which carry no items and are, therefore, to be skipped, so far as inventory changes are concerned.

It is another object of our invention to provide electrical selecting means for performing certain routines of electrical data-processing with improved efficiency. This feature of the invention reduces the amount of manual preparation with consequent reduction in error probability. It reduces the length of input messages to the processing equipment, thereby increasing the data handling speed.

Still another object is to provide control means having at least two alternative modes of operation for finding appropriate signal storage "bins" of a memory device. According to one mode access may be had to each of a given series of bins chosen sequentially and in predetermined order. According to another mode, access may be had to selected ones, but not all of said series of bins. The control means here referred to may take any of various forms, such as electronic, magnetic, semi-conductor, or rotary stepping switch types. In any case the control means chosen may be signal-controlled from a punched tape reader, the tape having been prepared as a by-product of typewriter operation. There are several well-known makes of machines available for combined typewriting and tape punching work. One of these is the so-called "Flexowriter," a product of the Commercial Controls Corp. of Rochester, N.Y. Another machine of this type is a product of International Business Machines Corp., their Patent No. 2,297,789 dated Oct. 6, 1952, being a disclosure of its important features.

The practice of our invention is found to be of particular convenience where a tabulating typewriter with tape punching equipment attached for producing a code tape as a by-product of the typing is utilized. The paper form preferably used is one having vertical rules to separate items of different sub-identities which may be written in their respective columns for a given style or category of a given group classification. The column headings are printed to show different sizes of the same category or style, where each line of writing carries items of the same style. The sub-identity of each column may be a variation of weight, color or other distinguishing characteristic. But due to the printing of the column headings it is not desirable that the sub-identities should be reduced to codification by the typist. She, therefore, omits the typing of these sub-identity codes and the equipment of our invention supplies them by inference to the data-processing equipment. In other words, the tape merely requires the conventional "tabulating" or "letter spacing" coded perforations which, by reason of the translating action of the mechanism according to the invention, causes the "tabulation" to be translated into an address signal correlated with the sub-identity of the class of items to be stored and processed in the conventional data processing equipment. For example, in the case of ladies' shoes, the style of shoe would be represented by the category code signal; the number of pairs would be represented by a plural digit number; and the sub-identity or size would be a translated signal derived from the conventional printing telegraph "tabulating" and "letter space" signals. Thus, the operator is not required to operate the printing telegraph typewriter to insert any special coded signals to represent the sub-identity classification.

Thus, where we use electronic or high-speed data processing equipment for handling the data to be processed, it is an object of our invention to minimize the work of preparing the input data by omitting sub-identity addresses and codifying only the category address of the items to be processed, means being provided within the data processing equipment for obtaining the sub-identity designations.

It is a feature of our invention to provide sub-identity addresses to a data processing computer and its associated memory system without resort to the usual method of tagging each quantitative signal with an accompanying signal that would designate its sub-identity; but contrariwise, such identities would be yielded by means of sub-identity code signals generated within the data processing equipment under control of a stepping switch and maintained in synchronism with the input of a train of quantitative signals coming from a tape reader. Furthermore, our novel method of address generation is operable despite the need for processing a succession of items of different sub-identities within a given category but where skips are present, that is, where only selected ones of the items of that category are to be processed.

Data processing systems of the type we are now considering and for which our invention is well adapted to be incorporated therein are sometimes given an efficiency rating based on the speed with which they attain random access to different bins of memory storage. Whatever the memory bin access system may be, there is an obvious advantage to be gained when using our method of supplying sub-identity addresses locally with respect to the data processing device, rather than by the decoding of such addresses when supplied by a perforated tape which is read and transmitted from a remote point. We shall not, therefore, dwell further upon the merits of different memory systems. They may be in the form of a constantly rotating magnetic drum the periphery of which carries magnetic recording tracks to be scanned by read-write heads.

Alternatively, the memory device may be composed of numerous individual magnetizable elements, one for each bit of information. These elements are subject to polarization by input signals and are capable of yielding that information which is stored, that is, when queried by a read-out signal of lower value than the input signal. These techniques for the use of a memory system are well known in the art. Our invention, however, is more directly concerned with improvements in the programming routines which may be advantageously adopted for data processing, particularly where the data can be classified as having numerous items of varied format within each of a number of category groups.

Our invention should be regarded as an improvement in programming facilities and as being applicable to many kinds of data processing equipment which have various computing and memory storage objectives, and components designed to meet the same.

According to our invention the improvements of programming techniques begin with the manner in which the tabulating typewriter and connected tape punch are set up to do a specific piece of routine work. We shall presently show how a random access memory system can be operated in response to one or the other of two signals suitably interspersed between trains of data-giving signals so as to obtain locally an essential sub-identity address for each of a succession of said data-giving signals. Since these signals successively originate concurrently with different positions of the typewriter carriage as reached for item tabulation, there is a need for converting typewriter carriage position into an address corresponding to the columnar position of each item as typed. Our invention meets this need. If skips are made by use of the tabulator key, then corresponding skips must be made by certain means in the data processing equipment which seeks to bring out individual items of the memory system, and then (in the case of an inventory routine) while combining the item of read-out algebraically with the input item supplied by the tape reader, the new inventory balance must be recorded in the selected bin in place of the old balance.

The usual techniques for obtaining rapid random access to different bins of a memory system rely on buffer storage of the address and milli-second or micro-second timing of the gate which makes a read-out or a recording of the data item. These techniques being well known in the art, we do not find it necessary to explain them further than to indicate how they may be advantageously practiced with the aid of our novel improvements as applied to buffer storage of the items to be data-processed. This buffer storage may, and usually does, constitute a component of an electronic computer. In any case the items stored therein are suitably identified by the addresses which are supplied by the operation of our system, rather than by a read-out of such addresses from code signals delivered by a punched tape reader.

An important feature of our invention which will presently be explained in detail is that when skip-selection of bins for items of different sub-identities is required for a particular piece of programming, a certain format of set-up of bin address composing equipment is arranged to conform with a particular choice of tabulator stop positions at which to arrest the typewriter carriage for the tabulation of statistical data as typed on a printed paper form in columnar fashion. The number of character spaces between tab-stop positions may be varied at will along the writing line, but the sub-identity address-composing equipment must be arranged to follow the pattern of the tab-stop settings in order to yield the proper addresses for data processing.

In the detailed description to follow, reference will be made to the accompanying drawings wherein, FIGURE 1 shows by way of example an invoice form which is designed for writing up a multiplicity of items of different categories, that is, catalog numbers or styles, each line of the form being devoted to a given category and including quantity variations as to items of different size or other characteristics.

Technical literature abounds which may be referred to for explaining conventional data processing techniques. Any reader of our specification assumed to be skilled in the art will, doubtless, have no need to refer to those publications for a full understanding of the nature of our contribution to that art.

For the assistance of those interested in pertinent literature we refer to the following as being representative:

"High Speed Computing Devices" (1950, McGraw-Hill)

Any of the issues of the Journal of the Association for Computing Machinery prior to the filing date of this application Patents 2,540,654, issued Feb. 6, 1951, to Cohen et al.; 2,587,532, issued Feb. 26, 1952, to Schmidt; 2,737,342, issued March 6, 1956, to Nelson.

The writing of an invoice simultaneously with preparation of a code tape for inventory control will now be discussed with reference to FIG. 1. Each line of the invoice form is devoted to a particular style of merchandise; which, for purposes of illustration, may be considered footwear. Vertical rules on the form separate different sizes. Between these rules there is sufficient space to write three digits of a quantity. After the units digit of one quantity for a given size has been written, operation of the space bar will bring the carriage into position to write the hundreds digit of a quantity for the next larger size.

Figure 1:
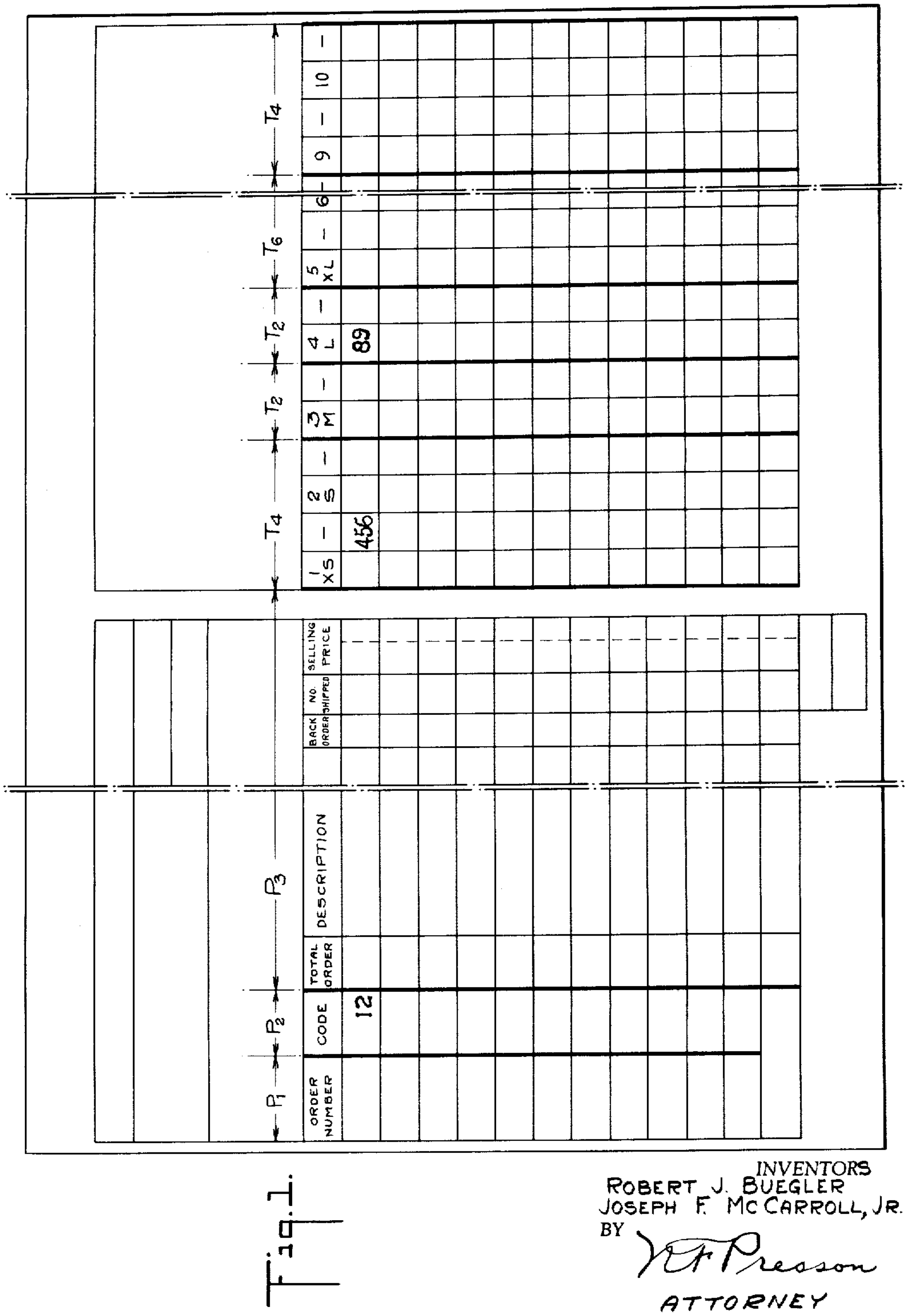

The invoice form shown in FIG. 1 has writing areas which are customarily required for the name and address of the customer, date, order number, and other information which is not pertinent to inventory maintenance. Although the tape which is punched as a by-product of the invoice typing may include code signals for such information, the operation of inventory data processing is made insensitive to irrelevant signals, either by automatically producing an abridged tape which omits unwanted signals, or by other provisions of the data processing equipment which will be explained hereinafter. The original tape, however, has uses other than for inventory maintenance, since it carries information of value to the accountant, the sales manager, the credit manager, the production manager, the buyer, and other executives. The data thereon may be automatically reduced to punched cards or other tabulating facilities. Our invention may serve usefully in connection with any of these routines. The general principles of the invention itself, however, would seem to be sufficiently disclosed by its application to the inventory system which we shall describe in this specification.

From what is said in the preceding paragraph it will be clear that columns designated $P_1$ and $P_3$ of FIG. 1 would be irrelevant to inventory routines, but column $P_2$ would serve to record a style number or other category designation. Columns headed T with subscripts are for quantity designations respecting different sizes, the half-sizes being indicated simply by hyphens.

The heavy vertical rules shown on the invoice or order form, FIG. 1, indicate where, after using the tabulator key, the typist may resume typing in the first space to the right of any of these heavy rules. If a 3-digit quantity is to be written, that quantity will fill the writing space for a given size of footwear. One space-bar operation should precede the writing of a 2-digit quantity. Two space-bar operations should precede a single digit quantity. The next space-bar operation will then bring the paper into position for writing in the next size column. But if no quantity is to be written in a column or columns to the left of the next heavy rule, the tabulator key may be depressed, in which case a tab-signal will be punched in the tape to be used by the data processing equipment when the tape is fed through a tape reader.

FIG. 1 shows illustratively the writing of a code number "12" in column $P_2$ which may be considered a style or category designation. Matter written in columns $P_3$ would be irrelevant to inventory data processing, so it may be arranged by means of a programming code signal in the tape to have this matter rejected, if transmitted to the inventory control system. Otherwise the tape used for inventory control will be abridged by the deletion of signals appearing in columns $P_3$.

Let it be assumed that the invoice is to show 456 pairs of size 1½ and 89 pairs of size 4 shipped. Use of the tabulator key following the writing in columns $P_3$ will bring the carriage into position to write in the column for size $$\frac{1}{\text{XS}}$$

where the designation "XS" means "extra small." This column being left blank, the space-bar will need to be operated four times in order to move the carriage into position for writing the quantity "456" in the column for size 1½. Then the tab key may be depressed twice for moving the carriage into position to write a quantity in the column for size $$\frac{4}{\text{L}}$$

In typing the invoice it will be apparent that the typist will use the tab-key whenever she reaches a point along a writing line where she can move the carriage across a heavy vertical rule so as to write the next significant quantity. At times, also she may need to use the space key to reach a "size" column further to the right of the tab-stop position. In any case, she will observe the requirements for space-bar operation so that the units digit of the quantity will come close to the next adjacent vertical rule of the form.

After writing all the quantities that are to be invoiced for a given style, whether or not the end of the line is reached, the carriage return key is depressed. A code signal is then punched in the tape which signifies this operation. At this point certain programming functions are performed automatically by the data processing equipment in recognition of the carriage return signal, as will be explained in due course.

*The Data-Processing Equipment*

The punched tape which is made as a by-product of the "Flexowriter" may be used at any convenient time after it has been prepared, assuming that the data processing equipment is in readiness to accept signals coming from a tape reader into which the tape is fed. The tape reader R is motorized and has a cadence which allows for much of the data-processing routines to be performed under control of the signals transmitted therefrom. Equipment is provided, however, for stopping the reader automatically whenever the processing steps require additional time. Resumption of the reader cadence then ensues automatically by means of a "clutch control circuit" unless the interruption should be caused by the occurrence of some error. After error correction re-starting of the reader may be made manually. Manual starting is also a preliminary step before the data processing work can be begun.

Figure 2:
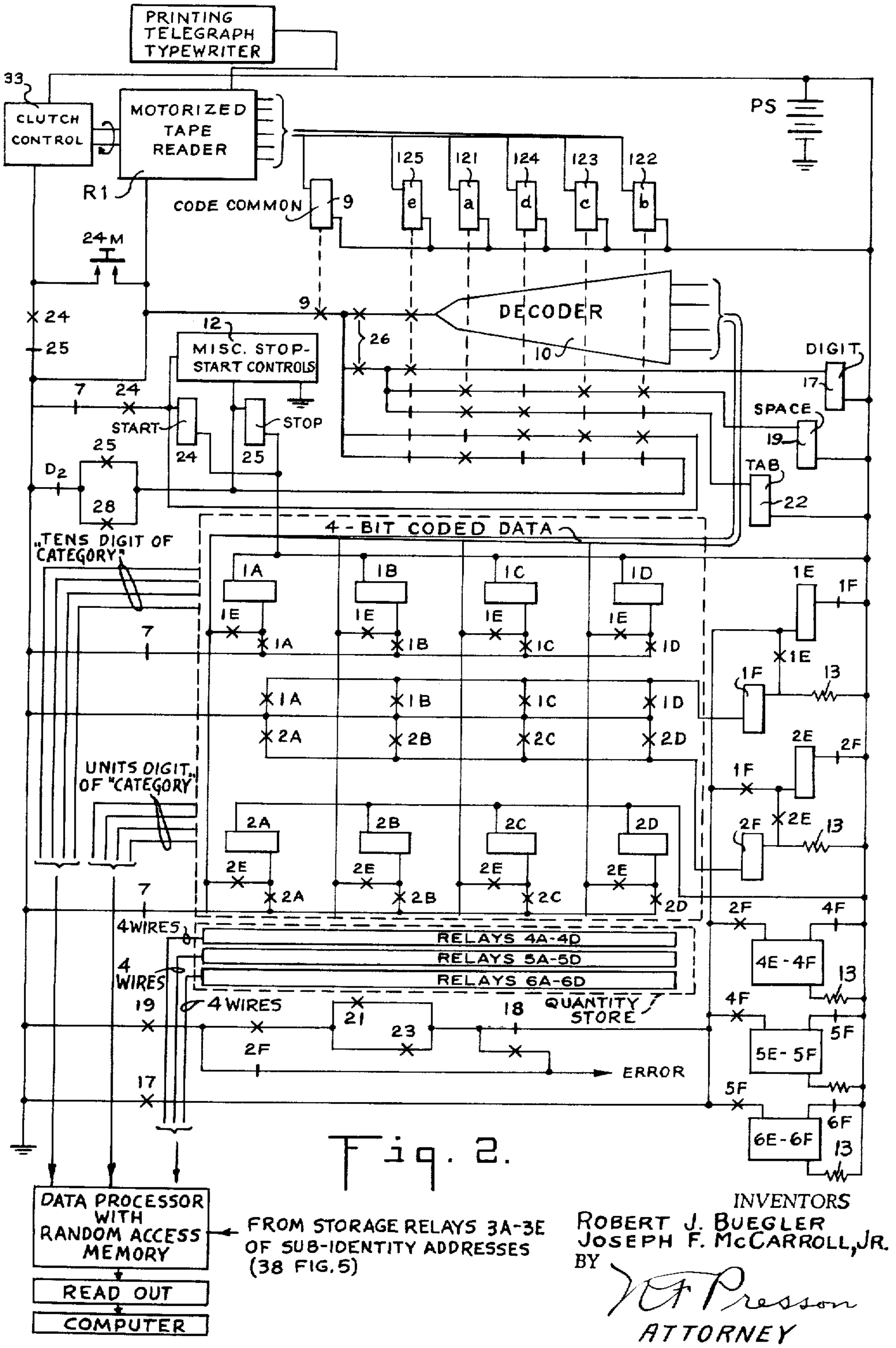
FIGURE 2 is a circuit diagram showing relays for the decoding and buffer storage of signals derived from a punched tape reader.
Figure 4:
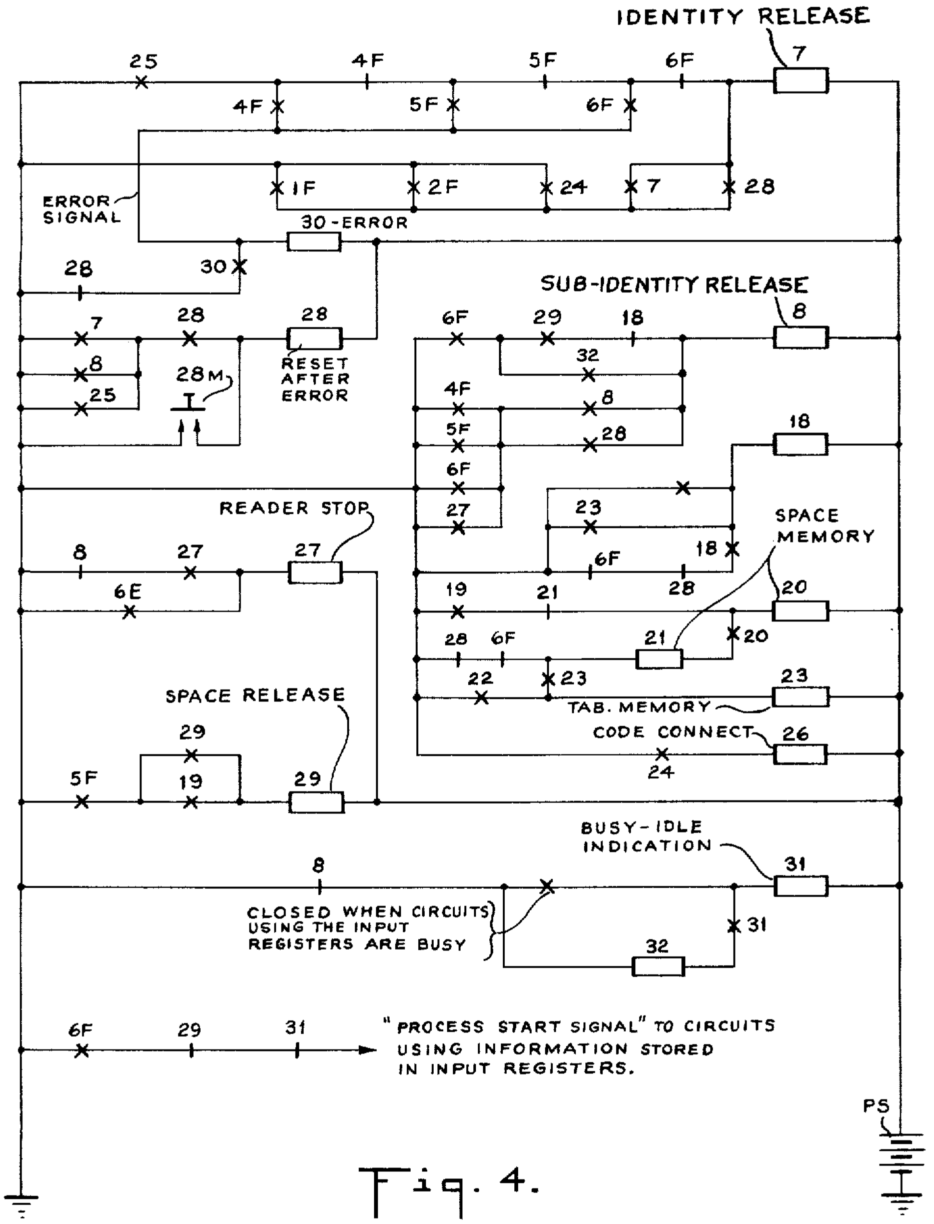
FIGURES 4 and 5 are also circuit diagrams showing the use of other relays which primarily operate to meet various programming requirements under different circumstances, or at different portions of a data processing cycle.
Figures 5, 6:
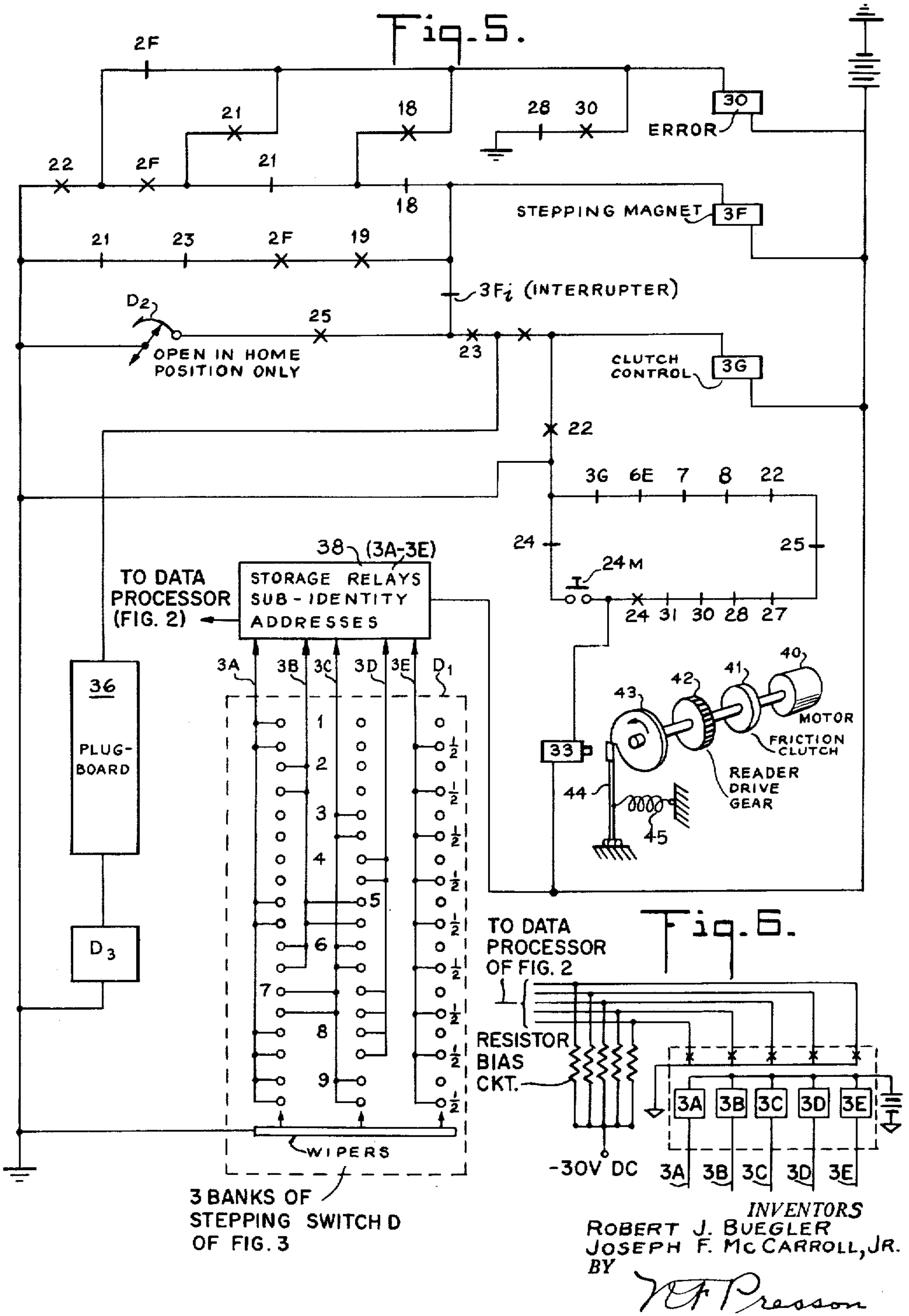
FIGURE 6 is a circuit diagram showing specific details of the relay unit 38 of FIGURES 3 and 5 for supplying sub-identity addresses.

Considering the relay circuits of FIGS. 2, 4 and 5, it will be understood that the general scheme of showing this circuitry follows the precedent of a patent to J. Michal et al., 2,722,675, granted November 1, 1955. In that patent a simplification of circuit delineation is adopted largely to avoid the crossing of conductors in different circuits. Contacts related to certain relay windings may be placed in any convenient position throughhout the circuits which are affected. In such circuits an indication of contact closure by an operated relay is made by means of an X across the conductor, this X being designated by the same reference as that of the associated relay winding itself. In like manner contacts which are closed when the relay is released are indicated by a straight line perpendicular to the conductor.

FIG. 2 shows a relay arrangement which includes a group of decoding relays 121–125 inclusive responsive to incoming code signals as transmitted by a motorized tape reader R. These relays, when permutationally operated, establish selected circuits through a pyramid of decoding contacts. The contact arrangement within the decoder pyramid 10 is conventional. Four circuits from this pyramid are carried to certain digit register relays. The tape reader also transmits signals which have programming functions. Five of these programming signals are decoded by the same decoding relays 121–125. A preferred choice of code bits is shown externally of the decoder pyramid 10 for specifically noting the composition of these programming signals. Actually the one pyramid 10 decodes all acceptable signals transmitted thereto by the tape reader.

The code bits of each signal may be transmitted serially or simultaneously, depending upon the availability of signalling channels between the tape reader and the data processing station. If the reader is not remotely situated, it is preferable to transmit the five code bits simultaneously over separate wires.

We do not wish to be restricted to the use of a signalling code of any particular permutational arrangement. The following selection of code bits, however, will serve illustratively as one which can be used in carrying out the objects of our invention:

| Relay<br>Bit | 121<br>a | 122<br>b | 123<br>c | 124<br>d | 125<br>e | Relay |
|---|---|---|---|---|---|---|
| 1 | X | — | — | — | X | |
| 2 | — | X | — | — | X | |
| 3 | — | — | X | — | X | |
| 4 | — | — | — | X | X | |
| 5 | X | X | — | — | X | |
| 6 | — | X | X | — | X | |
| 7 | — | — | X | X | X | |
| 8 | X | — | — | X | X | |
| 9 | X | — | X | — | X | |
| 0 | — | X | — | X | X | |
| Digit | — | — | — | — | X | 17 |
| Space | X | X | X | — | — | 19 |
| Tab | X | — | — | X | — | 22 |
| Start | — | X | X | X | — | 24 |
| Stop | X | — | — | — | — | 25 |

The above code-bit arrangement is arbitrary, but has the advantage that signals for the ten digits are recognized by the marked pyramid relay 125 (bit *e*) this relay being operated for selection of any of the digits; whereas, the principal programming relays 19, 22, 24 and 25 are coded with bit *e* unmarked.

When a magnetic drum is used for storing inventory balances in respect to a multiplicity of items, random access to different "bins" of item storage is accomplished by first storing each bin address in relays which thereafter operate to produce a gating pulse at the instant of scanning the magnetic record of a selected bin where the readout of the current balance of a particular inventory item is wanted for data processing in the computer. This operation enables the item balance to be stored in the computer and algebraically combined with a quantity the representation of which is also first stored in buffer storage relays. In FIG. 2 these relays are designated Quantity Store. Only the circuits leading to them are shown, since it is the control thereof with which our invention is concerned. The description to follow should make this clear. The registers are arranged for permutational selection by operation of the input signal decoder 10.

In the embodiment of our invention presently described the input registers for quantities are twelve in number, there being three groups of four registers or relays for selection of each of three orders of digits of the quantity to be processed by the computer. The steps of memory scanning, computer operation after storing therein the old item balance and the new item to be combined therewith, and the subsequent recording of the new item balance are operations with which those skilled in the art are presumed to be quite familiar. It is obvious that the items to be data-processed require addresses, both for generic identification and for sub-identity reference. For the illustrated inventory of footwear, the code number written in column $P_2$ of the invoice shown in FIG. 1 gives the "style" for generic identification. This number is the first to be decoded by the decoder pyramid 10 after establishing running conditions for the data-processing equipment. In FIG. 2 buffer storage relays 1A, 1B, 1C, and 1D are shown for holding the tens digit of the identity code while quantities of all "sizes" or sub-identities are being processed in the computer with respect to the particular style. Buffer storage relays 2A, 2B, 2C, and 2D are likewise shown in FIG. 2 for holding the units digit of the identity code.

*The Tape Reader and Start-Stop Control Therefor*

In operation, the motor 40 (FIG. 5) runs continuously, but the reader R cycles only when its drive gear 42 is released by disengagement of a detent 44 from a step on the clutch cam 43. The detent 44 may serve also as an armature for a clutch release magnet 33 which is subject to control as part of the programming procedure. When the magnet 33 is not energized the reader is stopped, and slippage occurs in the friction clutch 41.

If the data processing steps can be taken as fast as the cycling steps of the tape reader R, then the drive gear 42 and release cam 43 will run continuously and one of the signals punched in the tape will be read with each revolution. If any need arises for causing the reader cycling to be interrupted, this can be accomplished simply by de-energizing the magnet 33. Such needs will be explained in due course.

The start signal must be punched in the tape as the first code to be sensed by the pyramid relays 122, 123 and 124. The first start of reader operation for a given length of code tape is obtained by means of a manual switch 24*m* (FIG. 2). Upon transmission of the start code signal by the reader, the start relay 24 operates and is locked up for the duration of the message, that is, until a stop signal appears for operation of relay 25, or in case of error detection, as will be discussed later.

*Signal Input to the Data-Processing Equipment*

The code-responsive relays 121–125 operate to discriminate between signals of different code composition. Hence the decoder pyramid 10 is sometimes called a discriminator, but is in no sense of the type used in radio receiving circuits. The reader R is arranged to transmit pulses following each code signal but with a split second delay in order to allow time for the relays 121–125 to establish their chosen selecting circuits before the interpretation thereof could be garbled by contact chatter. The delayed pulses are responded to by relay 9, its opearting circuit being controlled by the reader R, if desired, particularly if the cadence of signalling originates with the tape reader. So a sixth conductor from the reader to the relay 9 is used to operate the same cyclically; otherwise relay 9 could be operated through a delay circuit in response to the operation of make-contacts parallel-connected for this purpose in relays 121–125. Relay 9, the "code common" relay, has a contact closure to be made at the apex of the pyramid before relays 121–125 release after each signal reception. It thus delivers operating pulses to selected output circuits at the base of the pyramid, including programming relay circuits when selected. Still another circuit closure is necessary, however, for delivering these operating pulses; it is made by relay 26 which is in effect a slave relay operating and releasing at all times according to the operation of the start relay 24. Relays 24 and 26 are not operated during the reading of matter which is irrelevant to the data processing procedure. Alternatively, relay 26 could be somewhat freed from complete slavery to relay 24 if it were desired to release it temporarily without releasing relay 24. In this case all signals for matter such as might be encoded for invoice writing in columns $P_3$ (FIG. 1) would be rejected, despite the operation of relays 121–125, so that the data processing steps would be immune to the contamination of irrelevant signals.

*Input Signal Discrimination*

It will be remembered that the punched tape fed through the reader R has a train of code signals which follow the format of invoice writing as shown, for example, in FIG. 1. The decoder 10 of the inventory system utilizes numerical signals and properly interspersed programming signals. The data processing equipment is made immune to the reception of irrelevant signals as explained above.

The utilized signals must, however, be held in buffer storage, since the decoding relays 121–125 are operated and released for each code signal.

The code bit *e* is sensed by decoding relay 125 only when a numerical signal is decoded. So there are contacts closed by relay 125 to establish any and all of the needed connections to the buffer relays for registering numerical quantities. "Digit relay" 17 is also selected and released upon decoding each digit signal. Its purpose is to enable the operation of relays 1E, 2E, 4E, 5E, and 6E in stepwise fashion and at times to operate a digit memory relay 18 after a space signal or a tab signal has been decoded.

Relays 1F, 2F, 4F, 5F, and 6F are respectively operated under control of their associated E-relays. As relay pairs their progressive operation and release serves as a relay stepping switch that is held in synchronism with actuations of the digit relay 17. This technique follows the teachings of Patent 2,183,147 granted December 12, 1939, to John B. Moore et al. See FIG. 4 therein. The patent was reissued as Re. 22,394 on Nov. 23, 1943.

The first two digit signals to be decoded represent the tens digit and the units digit of the "style" identification. These relays, 1A . . . 1D, 2A . . . 2D are self locking, as shown. But they are first selected only when relays 1E and 2E complete their respective operating circuits in stepwise fashion.

Operation of any E-relay prepares a path from ground to the junction of its associated F-relay and shunting the associated resistor 13 until after relay 17 drops. But the make-contact on relay 17, on opening, removes ground potential between the winding of the F-relay and resistor 13, so that relay F will energize from contacts on any activated register relays A . . . D until the storage of their data can be processed; that is, handled by the memory system and the computer. In the case of storing the tens and units digits of the Identity Code, these relays are self-locking and are released usually by break contacts on the identity release relay 7. In the case of storing quantities for different sizes, the registers therefor are progressively selected in the same manner, the relays being referenced 4A . . . 4D, 5A . . . 5D, and 6A . . . 6D, and being sufficient to store a number of three digital orders. After use in the data-processing of a quantity for a given sub-identity or size, they are released by sub-identity release relay 8 and made available for repeated buffer storage of the quantities respecting other sizes of the same style of footwear.

The resistors 13 which are in series with the F-relays serve to prevent operation of the same until after an E-relay has dropped; that is, after the digit relay 17 releases. The value of the resistor 13 is suitably chosen to enable the F-relay to operate reliably in view of shifts of contact closings and openings produced by the E-relay and the F-relay. It will be noted that the E-relay has a break contact operated by the F-relay for the purpose of unlocking it when the F-relay operates. The box 12 serves to indicate provision for stop-start controls of a general nature not necessary to discuss in this disclosure.

The space signal XXX-- is properly used to operate the space relay 19 for decimal tabulation of quantities (as originally typed on the invoice) in their respective size columns. An error is indicated by the circuitry as shown at the bottom of FIG. 2 if a space signal should be improperly located in the signal train.

*The Address Composer for Sub-Identities*

We come now to what seems to be the heart of the invention. It is largely shown in FIG. 3, but other figures of the drawing will be referred to occasionally. With a few exceptions the references to different relays will be found to correspond with those of corresponding relays in the other figures of the drawings. If not, then different modifications of the invention will be understood. What we shall now describe is the means employed for supplying sub-identity addresses by which to seek different bins of the memory system for the data-processing of the items which are transmitted by the tape reader R without the accompaniment of such addresses.

Figure 3:
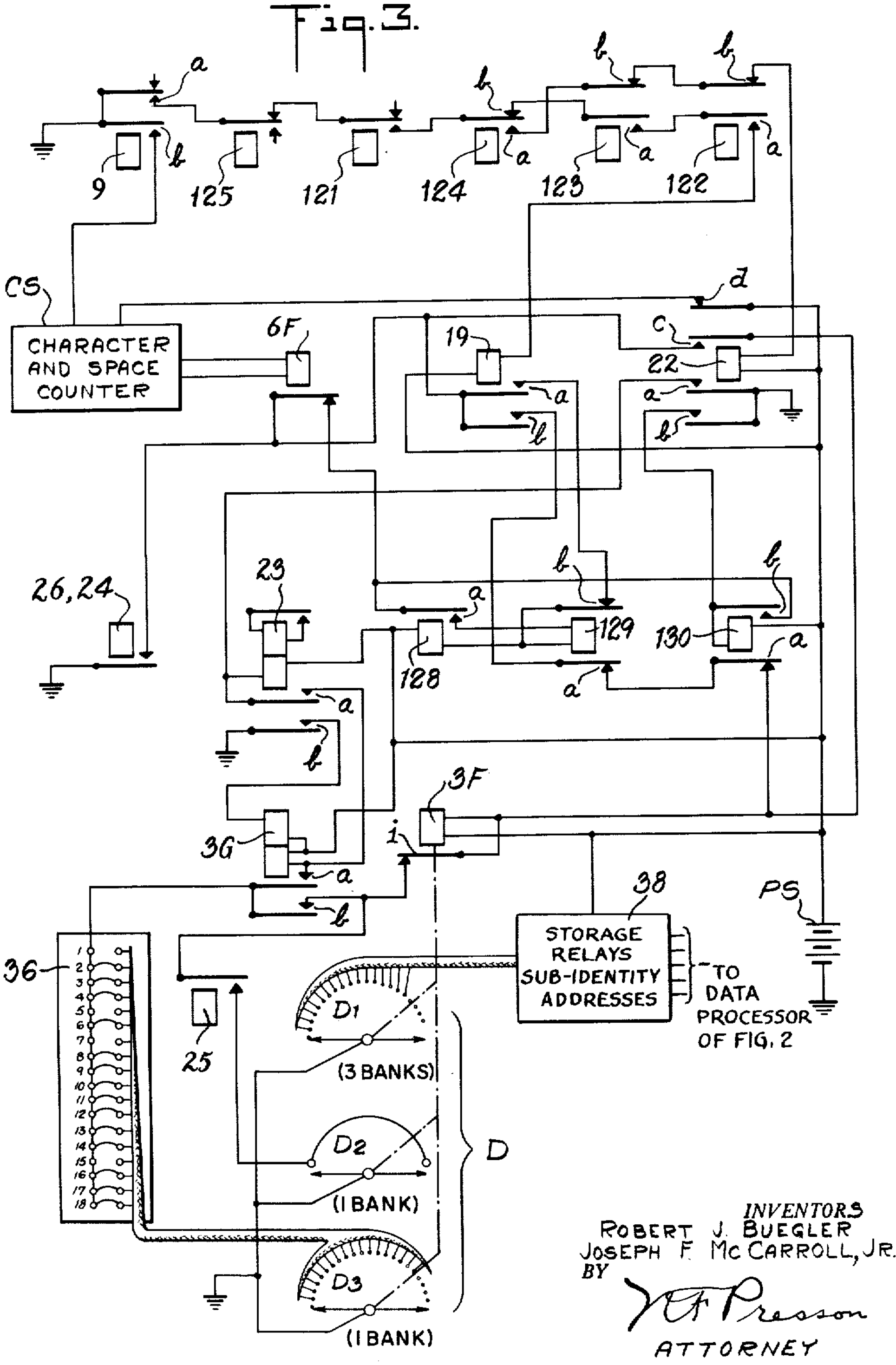
FIGURE 3 is another circuit diagram which includes relays relied upon chiefly for alternative programming purposes.

The signal-responsive relays 9 and 121–125 shown at the top of FIG. 3 are the same as have been described with reference to FIG. 2. But in FIG. 3 we are only concerned with the de-coding of the space-signal XXX-- to which relay 19 responds, and the tab-signal X--X- to which relay 22 responds. Operation of the relays 19 and 22 at proper times interspersed with the relay responses to other signals as described above will enable the necessary sub-identity addresses to be composed for use in the computer and memory system along with the quantitative data for which signals are transmitted by the tape reader R.

A rotary stepping switch D has at least five banks, three banks $D_1$, of which only one bank is shown in FIGURE 3, have their contacts arranged to complete selectively the circuits for five address code relays 3A, 3B, 3C, 3D, and 3E. The three banks $D_1$ would be sufficient if no more than three of the five relays were to be selected to compose any one address code. This is quite possible when there is a limited range of sub-identity addresses. In fact, for footwear size addresses, for which our inventory system is presently used, full sizes could be signified by a choice of two at most among four of the code-composing relays and relay 3E could, when selected, indicate a half-size larger than that for which the code combination of relays 3A . . . 3D stands.

FIG. 5 shows an arbitrary arrangement of connections between the segment terminals of three banks $D_1$ and the address code relays 3A . . . 3E as described in the preceding paragraph. Rotary switch bank $D_2$ represents an off-normal homing switch the construction of which is sometimes simpler than when (as here shown) it utilizes interconnected off-normal segments.

Rotary switch bank $D_3$ has all of the useful ones of its segments individually connected to a row of terminals or jacks of a plug-board 36. Jumper wires are used to interconnect corresponding jacks of the two rows except where the rotary switch is intended to stop in response to the reception of a tab signal. Such response is made effective only when it is coincident with the reading of a tab signal in the code tape that was punched while moving the invoice form through the several columns that are headed for different "sizes."

On the "Flexowriter" tab stops are set to move the carriage across any of the several heavy vertical rules between size-columns, as shown in FIG. 1. The first tab signal to be used after designating the code number for style identity represents tabulation into position to write a quantity for size $$\frac{1}{xs}$$

Plug-board jacks #1 are left disconnected, so as to arrest a buzzing circuit for rotary switch operation in response to the tab signal when received at this point of the programming. Other arrests of the buzzing circuit are made so as to bring the rotary switch to a point for designating a size-identity code which corresponds with a quantity to be data-processed for a size shown in FIG. 1 next to the right of a heavy vertical rule.

*Space-Signal Mode of Address Derivation*

The above captioned mode is constituted as a routine which is initiated by decoding that particular space signal XXX-- which, in the punched tape, corresponds with spacing the Flexowriter carriage across a vertical rule of the invoice (FIG. 1). The alternative routine is initiated by the tab signal X--X-. In FIGS. 2 and 3 it is shown that the decoding relays 125, 121, 124, 122 and 123 are settable to interpret either of these signals. Relay 125 is placed at the head of the pyramidal discriminator circuit merely for convenience, since it has a make contact for decoding all digit signals, i.e., "0, 1–9," as well as for selecting the digit relay 17 without further discrimination.

When the quantity for any sub-identity item, that is, the given size of foot-wear, is expressed in less than three digits, or no digits, the space bar is used to move the carriage along, but the coincident space signals are dealt with by the data processor for stepping its relay counting chain in a uniform manner which has the effect of maintaining synchronism between the storage of the quantity for each size and the composition of the bin address therefor. It is the function of the rotary stepping switch D and the programming relays associated therewith, as shown in FIG. 3 to accomplish this address composition and to maintain that synchronism.

In FIG. 3 the block labeled "Character and Space Counter" and referenced CS represents suitable means for counting the first space signal and three digit or space signals corresponding to data for a given size. The unit may be of any type which is capable of counting from zero (0) through four (4) and repeat. Preferably, however, the unit CS may be considered symbolic of the same stepping relays 3F, 4F, 5F and 6F, at least with respect to the functions performed by relays 4F, 5F and 6F, as shown in FIG. 2, and by the stepping magnet 3F as shown in FIG. 3.

The data processing of all sizes for a given style of goods is carried out during one period of lock-up of start-relay 24, relay 26 being held concurrently as a slave relay. These relays are released after decoding the carriage return signal, as responded to by stop relay 25; but not until the switch D has been "homed" through its homing circuit as prepared by relay 25, as will be explained in due course.

Space relay 19 responds to all decodings of the space signals and the first of four such signals operates the stepping switch magnet 3F through a circuit which may be traced as follows: Ground potential is carried through closed contacts of relay 24 or 26, contacts *b* of relay 19, contacts *a* of relays 129 and 130, and the winding of magnet 3F to the power source PS. Note that the Code-connect relay 26 (a slave to relay 24) must be operated in order to complete this circuit in the first place before decoding and utilizing the style identity signal as typed in column $P_2$ (FIG. 1). If desired, relay 26 can, obviously, be released for the purpose of rejecting the effects of decoding relay responses, as when repeating what the reader R would transmit corresponding to matter written in columns $P_3$ of the invoice. On restoring the operation of relay 26, the tab signal is usually read, which positions the stepping switch D into a setting for data processing in respect to the first item of a particular size, namely, size "1."

Illustratively the first significant digits shown in FIG. 1 for a size are the quantity "456" which occupies the invoice column for size 1½. In order to skip size "1" relay 19 will be operated three times, representing blanks or spaces in place of the three digits of size "1." Relay pairs 4E, 4F; 5E, 5F; and 6E, 6F will be operated and released successively in order to make this skip. Upon operation of relay 6F the quantity registers will be re-set and made ready to store the quantity "456" for size 1½. Details of such programming will be described later.

Now the fourth space signal that is next decoded corresponds with setting the Flexowriter carriage into position for writing the quantity "456" mentioned above for size 1½. At this point, the stepping switch D must be enabled to take one step. The previously described circuit for operating the stepping magnet 3F is then closed in response to the closure of contacts *b* of relay 19. The wipers for switch banks $D_1$ (three of them) are now positioned for composing the address for size 1½. Relays 38 of the group 3A . . . 3E are thus selected and held operated while data-processing the quantity "456." Relays 38 are sub-identity address relays which serve in co-operation with the style address relays 1A . . . 1D and 2A . . . 2D (FIG. 2) to control the bin-seeking operations of the inventory memory system.

The character and space counter CS shown in FIG. 3 may be considered a modification of the relay network shown in FIG. 2 for counting digits and spaces. The end result is the same, namely, to restrain the stepping switch D from further actuation while data processing in respect to a given size. Thus, according to FIG. 3 the first decoding of the space signal for an effective stepping switch operation causes relay 128 to operate, its winding being connected to ground through contact *b* of relay 129, thence through contact *a* of relay 19 and closed contacts of relay 24, 26. The power supply PS is permanently connected to the other terminal of relay 128. Operation of relay 128 prepares an operating circuit for relay 129 by closing contacts *a* of relay 128. This circuit closure only grounds both terminals of relay 129, so that this relay operates only upon release of relay 19. Then the two relays become series-connected between the terminals of the source PS.

Relays 128 and 129 in the FIG. 3 version of our invention correspond with space memory relays 20 and 21 (FIG. 4) which will be described later in regard to the programming aspects of our invention. It will be noted that these relays function like an escapement in a watch movement. Their operation is also like that of the relay pairs 1E—1F, 2E—2F, etc. as shown in FIG. 2.

The inhibiting effect of the relay pair 128, 129 upon further operation of the stepping switch magnet 3F while data processing for a given size is accomplished by holding open the operating circuit for magnet 3F at contacts *a* of relay 129. This effect is terminated upon counting the fourth digit or space by means of the counter CS, whereat relay 6F opens the locking circuit that was closed through contacts *a* of relay 128. At this time data processing is to be done with respect to another size.

*Tab-Signal Mode of Address Derivation*

The "Tab-signal" X– –X– when received is responded to by relay 22 which holds only for the duration of the signal itself. Several more prolonged effects are initiated, however. Closure of its contacts *c* causes the stepping switch magnet 3F for rotary switch D to take one step. Further steps, when needed for address composition at this point are made possible by operation of a "Tab-memory" relay 23 and its slave relay 3G, the latter having locking contacts *a* which produce a holding effect on both of these relays which is dependent upon the position of the grounded wiper that sweeps switch bank $D_3$. This holding effect is obtained by carrying ground potential through successively switched connections in a plug-board 36 and thence through contacts *a* of both relays to the lower coil of relay 23. The other terminal of this coil is connected to the power supply PS. While relay 23 is thus locked up the upper winding of relay 3G remains energized, its circuit being grounded through contacts *b* of relay 23.

Relay 23 has a slow-release winding which is shorted through a contact closure therefor as shown. Both relays 23 and 3G are released after switch D has been buzzed to a position corresponding to a disconnected cross-over jack on the plug-board 36. Relay 3G has control over the reader clutch magnet 33 as well as for enabling the buzzing operation to be performed by the interrupter contact *i* on magnet 3F. This will be explained later with reference to FIG. 5.

The response of relay 22 to the tab signal causes relays 130, 23 and 3G to be locked up, relay 130 having locking contacts *b*; the locking circuit for the other relays having been explained in the preceding paragraph. Relay 130 is unlocked by a break contact of relay 6F after completion of data processing with respect to one item of sub-identity selection. While relay 130 holds, its break-contacts *a* inhibit operation of the stepping switch magnet 3F when further space signals are received before relay 6F operates.

In the plug board 36 jumper wires are shown connected across jacks where skips should be made over positions for which no addresses are needed. The disconnected jacks represent tab-stop positions on the "Flexowriter" carriage. So the tab signal causes the sub-identity address-composing equipment to be selective of the address which is needed for processing the next item of a given sub-identity. Rotary switch banks $D_1$ have their segments suitably connected to address code relays 3A . . . 3E, for permutational selection. These are buffer storage relays (block 38 in FIG. 3) which provide control for seeking selective storage-bin access for read-out of the old inventory balance, and for input of the new balance after processing by the computer. After this processing is done with respect to one item of size-identity, the buffer storage relays for that size selection are released and the reader clutch magnet 33 (FIG. 5) again pulls up automatically, since its operating circuit would then be closed through all of the relay breaker contacts that indicated the need for tape-reader interruption.

The grounding circuit through wiper and bank $D_3$, and thence through successive jumper wires in the plug board 36 extends through contact *a* of relay 3G for holding requirements, as described above. Also, through contact *b* of relay 3G, the buzzing circuit for relay 3F is extended to the interrupter contact *i* of the stepping switch magnet, and thence through the latter to source PS.

After data processing with respect to any one size, or sub-identity of items, a next-in-order address may be obtained by response to the tape reader of another tab signal or a space signal, provided that the tape has further items of information to be processed respecting the same style, or main identity. A homing operation is afterwards required and can be done in response to the carriage return signal which actuates relay 25. The homing circuit extends from ground through wiper and bank $D_2$, thence through closed contacts of relay 25 to the interrupter contact *i* and magnet 3F and source PS. The stepping switch is of the type wherein the wipers are moved from point to point under spring power, the magnet 3F serving to retract a pawl across a tooth of a ratchet wheel.

*Timing the Routines*

The cadence of the reader is one with which most of the data processing equipment can keep in step. When, however, the "tab" signal is used to initiate an operation of the stepping switch D, relay 3G is locked up until wiper on bank $D_3$ reaches a segment that is connected to an open circuit in the plug board 36, as has been explained above. FIG. 5 shows how, for this routine, the reader clutch control is made subject to the operation and release of relay 3G. The reader cadence is thus interrupted and can only be resumed when none of the circuit openers (as shown in FIG. 5) remain effective in removing ground potential from the winding of the clutch control magnet 33. As long as magnet 33 holds its armature 44 out of the path of the cam 43, the reader will be free-running and will transmit a code signal with each revolution of the drive gear 42.

The reader cadence may sometimes be interrupted for causes other than to complete a buzzing operation of the rotary switch D. As shown in FIG. 5, such interruption results from the operation of any one of the relays 3G, 6E, 7, 8, 22, 24, 25, 27, 28, 31, or 30. The reader cadence is afterward resumed when all of these relays are restored, provided, however, that relay 24 has not been released, as at the end of a message. For convenience of reference a catalog of relays follows, and their functions are briefly explained. The circuitry of the several figures of the drawing shows that in some instances a relay will be operated if either of two or more relays is operated. If the relay has a self-locking circuit, unlocking of the same can be effected by another relay which has break contacts in that circuit. Otherwise the locking circuit can be held by a make contact of another relay and the said locking circuit will unlock when the make contact opens. Furthermore, if a relay operating circuit requires the simultaneous operating condition of two or more relays, the make-contacts of such relays are shown to be in series in such a circuit. With this explanation the circuit diagrams of FIGS. 2, 3, 4 and 5, and the mode of operation of the relays that control the routines should be readily understood by those skilled in the art.

CATALOG OF RELAYS

| Relay | Fig. | |
|---|---|---|
| 1A–1D | 2 | Identity register—10's digit. |
| 2A–2D | 2 | Identity register—Units digit. |
| 3F | 3 | Motor magnet for stepping switch D (for sub-identity address composition). |
| 3G | 3 | Control for self-interrupter circuit of 3F. |
| | 5 | Reader clutch control. |
| 4A–4D | 2 | Input register, buffer storage of 100's digit. |
| 5A–5D | 2 | Input register, buffer storage of 10's digit. |
| 6A–6D | 2 | Input register, buffer storage of units digit. |
| 7 | 4 | Re-set identity registers. |
| 8 | 4 | Re-set quantity registers. |
| 9 | 2 | Signal controlled feeder to apex of pyramid 10. |
| 10 | 2 | Pyramid decoder contacts of signal-responding relays. |
| 12 | 2 | Stop-start controls, miscellaneous routines. |
| 17 | 2 | Digit relay. Distinguishes digits from other signals. |
| 18 | 4 | Digit memory. Operated by 17; stores signal. |
| 19 | 2, 3 | Space relay. Senses space signals. |
| 20 | 4 | Space memory. Same as relay 128 in FIG. 3. |
| 21 | 4 | Operates when 19 releases. Same as relay 129, FIG. 3. |
| 22 | 2, 3 | Tab relay. Senses tab signals. |
| 23 | 4 | Tab memory. Operated by 22; released by 6F. |
| 24 | 2 | Start signal. Holds for duration of message. |
| 25 | 2 | Stop signal. Indicates end of message (carriage return). Causes homing of stepping switch D. |
| 26 | 2 | Code connect. When not operated it inhibits response to signals by the data processing equipment. |
| 27 | 4 | Reader stop. Operated by 6E; is self-locking and is unlocked by 8. |
| 28 | 4 | Re-set after error. |
| 29 | 4 | Space release. See explanation hereinafter. |
| 31 | 4 | Busy-idle indication. Explained hereinafter. |
| 32 | 4 | Operates in series with 31; released by 8. |
| 33 | 5 | Clutch control magnet. |
| 38 | 3 | Address code relays. |
| 121, 122, 123, 124, 125 | 2, 3 | Code discriminator relays. |
| 128, 129 | 3 | Inhibits unwanted signal responses by 3F. |
| 130 | 3 | Tab memory. Same as 23 (FIG. 4). |

*Miscellaneous Explanatory Details*

Except for the interruption of the clutch circuit by the "Tab" operation of the stepping switch D, only two other conditions ordinarily release the clutch magnet 33. The first is detection of any error condition. When an error is detected, the error relay 30 opens the clutch control line until the circuit is reestablished by operation of relay 28. The second condition is the full loading of the quantity register (FIG. 2). When relay 6E is operated (indicating a code has been discriminated to fill register 6A, B, C and D) the clutch circuit is immediately interrupted by a break contact of 6E. Relay 6E also causes relay 27 to operate which then maintains the clutch circuit interrupted. At the time the last quantity register is filled (relays 6A, B, C and D), two courses of action may ensue. First, if the quantity in register 6 was a digit (0, 1–9), the information is then operated upon by the "Data Processing Device." After the "Busy-Idle" cycle, the quantity register (4, 5 and 6) is dumped by relay 8, and after all "reset" conditions are met, the clutch is operated for reading another sequence. The second course of action occurs when the quantity register 6 receives a "Space" code. The clutch circuit is interrupted in the same manner but the "Data Processing Device" does not receive a "load" indication. The "Space Release" relay 29 is activated causing relay 8 to "reset" the quantity register, and again, after all "reset" conditions are met, the clutch circuit is closed for reading another sequence.

Relay 8 is the partial reset relay used to reset the quantity portion of the distributor as successive sizes are entered for a particular style. It, as explained above, is operated by the end of a "Busy-Idle" sequence or by the "Space Release" circuit. Relay 7 is the full reset relay used to clear the style from the distributor and is operated by the "End" code after the last quantity for a style has been read from the tape. Both relays 7 and 8, while used for resetting, have break contacts in the clutch circuit to maintain the clutch interrupted until reset is completed.

Registers 4, 5 and 6, the quantity relays, are used successively as each new size is operated upon. This is the reason for having a separate reset relay 8 for this section of the distributor.

Relay 2F is the relay operated when relays 2A, B, C and D are filled with a digit. It may be used for any number of purposes required by the control circuits where the filing of register 2 indicates a unique condition. For instance, it is used to "Program" the error circuit in relay 3F circuit. It is also used as an auxiliary locking path for relay 7 to insure that relay 7 remains operated until register 2 is completely reset.

Relay 18 is a "Digit Memory" relay and is operated upon receipt of the first digit after relay 2F has operated (or in other words, the first quantity digit). It is used to "Program" the error circuit.

Relay 19 is the "Space" relay operated upon receipt of each "Space" code-signal. It is used to operate the stepping switch D, fill registers 4, 5 and 6, and to operate the "Space Release" circuit, depending upon the condition of the "Space Memory" relay 21.

Relay 21 is operated at the end of the first space code, not by each space code after the first. It is used to program the distributor, error, and space release operations in conjunction with the state of the distributor.

Relays 18, 20 and 21, and 23 are respectively the Digit, Space, and Tab memories. Their main function as already described is to program distributor and error circuit action. After relay 6F operates, indicating the quantity register is filled, relays 18, 20, 21 and 23 are set back to normal.

Relay 25, the "Stop" code relay, is used to reset the distributor completely (relay 7) and drop out relay 24, thereby switching reader clutch control out of the distributor circuits. The reader can then continue looking at extraneous codes until the next "Start" code occurs.

The function of the "Processing Start" Signal (FIGURE 4) is to determine the starting moment for scanning the memory device so as to gain access to its storage of the old balance of an inventory item to be modified by combining with a new item as presented and stored in the buffer registers. FIG. 2 implies that these registers constitute part of the data processing system, although only the circuits leading to them are indicated. They are twelve in number, four for each digit of a three-order quantity. They would be designated 4A . . . 4D for the 100's digit, 5A . . . 5D for the tens digit and 6A . . . 6D for the units digit. Their circuitry is like that which is shown for the identity code registers 1A . . . 1D and 2A . . . 2D. Preferably they store quantities in terms of "excess-3 binary digits," although other binary systems may be used.

If the relay stepping sequence 4E . . . 6F is performed in response to space signals, that is, if relay 19 (and not relay 17) causes this stepping sequence to occur, then, of course, there is no need for data processing at this point and re-set operations for the buffer relays are instituted. Otherwise the busy condition is denoted by the operation of relay 31. Relay 32 operates in series with relay 31, but only when the "idle" condition of the processing equipment results in the removal of ground potential from the locking contacts of relay 31, as shown in FIG. 4. Relay 32 on operating causes relay 8, the "re-set quantity" relay to operate. Relay 8 then opens the locking circuit for the two relays 31 and 32. In the common ground circuit for lock-up of the quantity relays 4A, 5A, and 6A, etc. there is a break contact operated by relay 8, so all of the buffer relays can be re-set and cleared for processing another item of the same category, that is, a different size of foot-wear, according to the illustrated embodiment of our invention. Interruption of the reader cadence will be seen to be continued during the "Busy" period as shown in the circuit for clutch control magnet 33 (FIG. 5) which has a break contact of relay 31 in its control path.

*Recapitulation*

Our method of supplying address codes to a data processing device without introducing them specifically as input signals is believed to possess such novelty as to support our claims. Nevertheless, so far as we know, the disclosure has other features of novelty for which we trust the scope of the claims will give us adequate protection.

For convenience of description the term "bin" is used in the specification and claims as a generic and descriptive term to refer to conventional storage units which, in the case of magnetic drum or magnetic disc memory devices, are more commonly referred to as information or data cells.

We claim:

1. In an automatic computer program system, a message source the message from which comprises digital code signals and interspersed control code signals, the digital signals being arranged in a fixed sequence, a memory device having separate storage bins for data storage of different items which possess generic identification and sub-identity classification, buffer storage components receptive of said digital signals, a stepwise operating distributor switch subject to control by said control code signals, means including said switch to set up an appropriate series of sub-identity addresses for the data-processing of items sequentially stored in said buffer storage components, means operative in accordance with the purport of certain of said digital signals having generic identification significance for gaining common access to bins of a selected generic group, this group being appropriate to the items currently stored by said buffer storage components, and data processing equipment to utilize said sub-identity addresses in conjunction with concurrently buffer-stored digital data for computationally combining that data with a read-out of related data as previously stored in bins having corresponding sub-identity addresses.

2. In a system for processing statistical data as supplied by the automatic readout of code signals where the data to be processed comprises a series of items arranged in fixed sequence but randomly chosen with respect to a full series, and where said code signals convey said series of items unaccompanied by specific identifying address code signals, certain interspersed code signals of the readout having programming significance, a signal-responsive decoder and memory device for setting up buffer storage of said items, stepping switch means for sequentially distributing the ordinal digits of said data to different buffer storage elements, and a device including other stepping switch means operative prior to said ordinal digit distribution, and under control of said interspersed code signals, for composing such address codes for specific identification of the buffer-stored items as is implied by their sequential order taken in combination with the purport of said interspersed code signals.

3. In a memory device for data storage, separate bins for concurrently storing a multiplicity of items, signaling means for group selection of a plurality of bins to be rendered successively accessible for read-out and/or input data processing, a source of signals the significance of which pertains to data items for which selected ones of said bins are appropriately reserved, certain of said signals representing category data, other signals representing data items and additional signals having programming significance, programming facilities for data processing with respect to signals received from said source, said facilities including address code composing means for seeking of access to suitably selected bins, a circuit for rendering said programming facilities responsive to said certain signals representing category data, and means for utilizing said additional signals transmitted over said circuit for obtaining progressive access to bins of the selected group in step with the receipt of said other signals, whereby said other signals representing data items are appropriately addressed to their respective bins, one of said additional signals being coded to provide an unbroken distribution of the data signals to bins serially arranged, and the other of said additional signals being coded to provide predetermined skips in said distribution from one bin to a non-adjacent bin of the series.

4. A programming system for the processing of data which is intended for storage in a magnetic memory device, said system comprising alternatively usable sets of components for obtaining sequential access to different serially disposed bins of said memory device, one of said component sets having a code signal counter responsive to input data signals and first coded signals, a distributor switch, control means for causing said switch to be stepwise advanced by one step in response to receipt of a designated one of said first coded signals, further control means operable to inhibit the advancement of said switch in response to first coded signals received before said counter has registered a predetermined count, means operable by said counter to terminate that inhibition, the other of said component sets having a control circuit arrangement for causing said switch to be advanced through a plurality of steps upon response of that arrangement to second coded signals, pre-settable means for limiting the extent of switch advancement each time it is advanced, and bin address code composing means selectable at different positions of said distributor switch, whereby appropriate bins are given access for the processing of data therein.

5. A magnetic memory device having a multiplicity of storage bins for identifiable statistical data items, local address-code-composing means progressively operable for carrying out a bin-access-seeking program of variable format which pertains to a series of data items to be processed and stored in bins respectively appropriate thereto, an electronic computer, a remote source of data signals including category and quantity signals having first and second coded signals interspersed therewith, means for referring said data signals to said computer for data processing therein in a fixed sequence, means for combining each item of the referred data signals algebraically with an item of corresponding address as previously stored in and read out from said bins, and means responsive to said first coded signals and said second coded signals for so controlling the operation of said address code composing means as to maintain the bin access seeking progression in step with requirements for appropriately processing said data items.

6. The combination according to claim 5 wherein said remote source of data signals is constituted as a reader of punched code tape, this tape having been code-punched coincidently with and corresponding to statistical data items as tabularly typed on a machine having tab-key control of its carriage, said tab-key control being signified as it occurs by a second coded signal on the tape.

7. A system for controlling the processing of statistical data content of a coded message member such for example as a perforated tape which in coded form includes category identification data, quantity data and interspersed programming data, comprising reading means for said member, a first buffer storage device for said category data as read from said member, a second buffer storage device for said quantity data as read from said member, translating means controlled by the reading of said interspersed programming data to derive therefrom sub-identity classification data of the category data as stored in the first mentioned buffer storage device, a third buffer storage device for said derived sub-identity classification data and means responsive to said buffer storage devices to control the memory device of a data processor.

8. In a statistical data processing and storage system of the kind employing a storage memory device having a multiplicity of information storage cells to which access is to be had under control of combinational coded line groups, one group representing category, a second group representing quantity, and a third group representing sub-identity classification, the combination of means to make a code record such as perforated tape having one class of signals representing category information, another class representing quantity information, said record also including programming function codes, and means to derive from said record an address code for said storage memory device, the last mentioned means including a first buffer storage device to store the category signals, a second buffer storage device to store the quantity signals, translating means to provide sub-identity classification signals in accordance with said programming function codes, a third storage device to store said sub-identity classification signals determined by the said translating means, and combinational coded line groups connecting said first, said second and said third storage devices to said storage memory device.

9. The combination according to claim 8 in which said means to derive said address code includes a decoder for said record, step-by-step mechanism for interrupting and then restarting the normal cadence of signal transmission to effect sequential operations and in said storage memory device, and signaling control means for determining the said cadence interruption and thereby to control the said start-stop mechanism.

10. A system according to claim 9 in which each of said first and said second buffer storage devices includes a relay bank, means including a reader for said record for operating the relays of said first and said second buffer storage devices in corresponding coded combinations, a step-by-step switching control for operating the relays of said first and said buffer storage devices in succession, and said translating means includes a step-by-step settable selector switch which is selectively set to any one of a number of different settings in accordance with said programming function codes for storing a corresponding code combination in said third storage device.

11. In a data processing system having a magnetic memory device including a multiplicity of data storage cells for concurrently storing therein a corresponding multiplicity of items, means for receiving a coded record having coded combinations of signals, certain signals representing category data, other signals representing quantity data, and additional signals interspersed therewith representing programming functions, programming equipment including means for reading said coded record and producing decoded signals in computational association with items previously stored in said memory device, said programming equipment including translating means for converting said additional signals into sub-identity category signals, and a step-by-step selector switch which is selectively set under control of said translating means to derive sub-identity address codes for said memory device.

12. A data processing system according to claim 11 in which said selector switch is provided with a stepping control circuit responsive to said translating means which is effective to cause the switch to perform a multiple stepping operation under control of one of said additional signals and to cause the said switch to effect a single step operation under control of another of said additional signals.

13. A data processing system according to claim 12 in which said stepping switch has a plurality of stationary switch contacts and respective movable wipers, said stepping control circuit has a connection board having manually replaceable cross-connections for controlling the operation of said stepping switch, a set of sub-identity relays, and means connected to said switch contacts for operating said relays in different coded combinations under control of the setting of said switch.

14. A system for processing a statistical data content of a code message tape which bears codes for a given category identification and bears a variably chosen number of quantity items selected from a full quota of items having sub-identity classification within that category, said tape also bearing suitably interspersed code signals of programming significance, said system comprising buffer storage elements receptive of input signals derived from a reading of said tape, step-by-step switching means operated in accordance with the reception of each input signal for selectively directing such input signals digitally into appropriate buffer storage elements, and special step-by-step switching means responsive to the said code signals of programming significance whereby the said code signals of programming significance are translated into coded output signals representing the sub-identity of each quantity item to be sequentially processed.

15. The method of controlling a storage memory of the random access kind by a transmitter of the kind which transmits character signals, first code signals and second code signals, which method comprises deriving from the character signals a coded combination of signals representing category information, deriving from the first code signals and the second code signals a coded combination of signals representing sub-identity classification, and applying said category and derived sub-identity signals to address a predetermined information cell in the storage memory.

16. In a memory device for data storage, separate bins for concurrently storing a multiplicity of data items, signaling means for group selection of a plurality of bins, wherein certain of the bins in the selected group are to be selected to the exclusion of others, said signaling means including means for reading a statistical record of a series of data items in sequence with a coded category signal identifying the group of bins corresponding to said series of data items and wherein the absence of a data item in said series is denoted by a special coded signal, bin-access-seeking means operative in response to each data item transmitted by said signaling means for seeking access to a corresponding one of said bins in said identified group and also operative to exclude the seeking of an unwanted bin in said identified group when said statistical record lacks a data item corresponding thereto, and means responsive to said special coded signal for controlling said bin-seeking means to exclude the seeking of said unwanted bin.

17. A system for processing items of data information randomly chosen from a series of items each having sub-identity classification comprising means for receiving a statistical record of said items of data information interspersed with first, second, and third coded signals having programming significance, said first coded signals each identifying the absence of an item in said series, said second signals each identifying the absence of a variable plurality of successive items in said series and said third signal indicating the end of a series, said items of data information and said first, said second, and said third coded signals being received in a predetermined sequence, first register means responsive to said receiving means for identifying said series of items, second means responsive to said receiving means for registering said items of information, addressable memory means for storing said items of information, stepping means synchronously operated with said receiving means for providing a series of sub-addresses corresponding to each of said sub-identity classifications, means responsive to each of said first coded signals for advancing said stepping means over a single sub-address and to said second coded signals for continuously advancing of said stepping means, means for limiting said continuous advance of said stepping means, means responsive to said stepping means in accordance with a sub-address presently provided and said first register means for addressing said addressable memory means, and means responsive to said third signal for resetting said first register.

18. A system for processing a statistical record comprising means for receiving a statistical record having a group of multi-digit items of data information selectively interspersed with first and second coded signals having programming significance, said items of data information being randomly chosen in sequence from a series of items of data information having sub-identity classifications, said first coded signal being indicative of the absence of a single digit in said statistical record, said second coded signal being indicative of the absence of a variable plurality of multi-digit items of data information in said statistical record, decoding means responsive to said receiving means for discriminating said multi-digit items and said first and said second coded signals, a plurality of means for registering said multi-digit items of data information, first stepping means synchronously operative with said receiving means upon the receipt of individual ones of said digits and said first coded signal for selectively directing each of said multi-digit items to said plurality of registering means, means responsive to said receiving means for identifying said series of items of data information, second stepping means for providing sub-identity addresses corresponding to said series of sub-identity classifications, means for counting said digits of each of said items of data information so received and said first coded signals, means jointly responsive to said counter means in a first condition and to said receiving means upon the receipt of a first coded signal for providing a single stepping operation to said second stepping means, means responsive to said receiving means upon the receipt of a second coded signal for providing a multiple stepping operation to said second stepping means, and means for selectively limiting said multiple stepping operation of said second stepping means.

19. A system for processing statistical data comprising means for receiving a statistical record of items of data information randomly chosen from a series of items each having a sub-identity classification, said statistical record including coded signals for identifying said series and, also, coded signals having programming significance, addressable means for storing said items of data information according to said sub-identity classifications, first means responsive to said receiving means for identifying said series of items, stepping means synchronously operated with said receiving means for successively identifying said sub-identity classifications of said series of items, second means responsive to said receiving means in accordance with said coded signals having programming significance for controlling said stepping means to identify only the sub-identity classifications of those items of data information appearing on said statistical record, and means responsive to said first means and said stepping means for addressing said storing means.

References Cited in the file of this patent

UNITED STATES PATENTS

| | | |
|---|---|---|
| 2,386,482 | Leathers et al. | Oct. 9, 1945 |
| 2,434,500 | Leathers et al. | Jan. 13, 1948 |
| 2,600,144 | Watson | June 10, 1952 |
| 2,721,990 | McNaney | Oct. 25, 1955 |